(12) United States Patent
Ishibashi et al.

(10) Patent No.: US 7,384,585 B2
(45) Date of Patent: Jun. 10, 2008

(54) METHOD FOR PRODUCING DRY PREFORM FOR COMPOSITE MATERIAL

(75) Inventors: Masayasu Ishibashi, Osaka (JP); Koichi Hashimoto, Osaka (JP); Hideki Sakonjo, Osaka (JP); Akira Iriguchi, Osaka (JP); Kazunori Morimoto, Osaka (JP); Takeshi Tanamura, Osaka (JP); Tetsuro Hirokawa, Osaka (JP)

(73) Assignee: Shikibo Ltd., Osaka-Fu (JP)

( * ) Notice: Subject to any disclaimer, the term of this patent is extended or adjusted under 35 U.S.C. 154(b) by 421 days.

(21) Appl. No.: 10/448,449

(22) Filed: May 28, 2003

(65) Prior Publication Data
US 2004/0134593 A1 Jul. 15, 2004

(30) Foreign Application Priority Data

| Jan. 14, 2003 | (JP) | 2003-006306 |
| Mar. 14, 2003 | (JP) | 2003-070426 |

(51) Int. Cl.
*B29C 45/14* (2006.01)

(52) U.S. Cl. .......................... 264/257; 264/296
(58) Field of Classification Search .............. None
See application file for complete search history.

(56) References Cited

U.S. PATENT DOCUMENTS

| 2,858,875 | A | * | 11/1958 | Lyman | 156/494 |
| 2,964,442 | A | * | 12/1960 | Hansen | 264/229 |
| 3,322,868 | A | * | 5/1967 | Rossello et al. | 264/46.5 |
| 3,664,907 | A | * | 5/1972 | Price | 428/57 |
| 4,404,156 | A | * | 9/1983 | Ogletree | 264/162 |
| 5,037,691 | A | * | 8/1991 | Medney et al. | 428/137 |
| 5,330,599 | A | * | 7/1994 | Aochi et al. | 156/173 |
| 2001/0006866 | A1 | | 7/2001 | Kuroiwa et al. | 442/366 |

FOREIGN PATENT DOCUMENTS

| FR | 2761379 | 10/1998 |
| JP | 57-133241 | 8/1982 |
| JP | 10-292255 | 11/1998 |

* cited by examiner

*Primary Examiner*—Edmund H. Lee
(74) *Attorney, Agent, or Firm*—J.C. Patents

(57) ABSTRACT

A novel process for producing a dry preform for a composite material takes advantage of the fact that a reinforcing filament assembly, when consisting of a fiber reinforcement layer a, formed by stringing a first set of parallel strands of fiber reinforcement over a part or all of the plane within any desired shape along the straight axis 2, and a fiber reinforcement layer b, formed by stringing a second set of parallel strands of fiber reinforcement over the plane at an angle θ with respect to the straight axis 2, such that 0°<θ<180°, the part of the reinforcing filament assembly that consists solely of the fiber reinforcement b can be deformed as desired. According to this process, strands c of fiber reinforcement are strung using a fiber reinforcement string jig as shown in FIGS. 8(A) and 8(B). The layers of the strung strands of fiber reinforcement are brought together by a simple means such as stitching. The integrated layer is then shaped into the reinforcing filament assemblies 3, 4, which are combined to form a dry preform 1 for making a composite material having any desired alignment of fiber reinforcement.

4 Claims, 13 Drawing Sheets

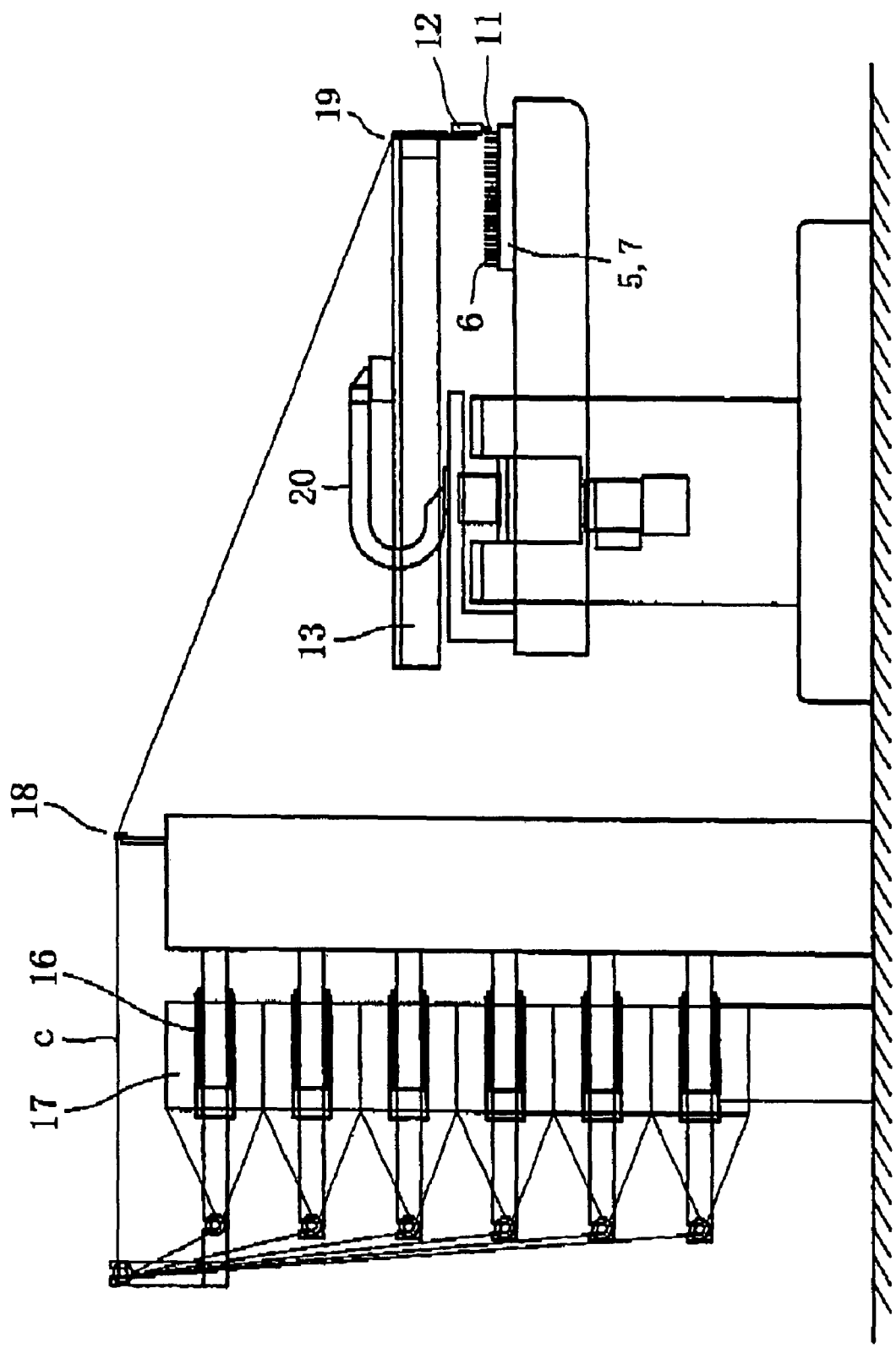

METHOD FOR PRODUCING DRY PREFORM FOR COMPOSITE MATERIAL

BACKGROUND OF THE INVENTION

1. Field of the Invention

The present invention relates to a method and an apparatus for producing dry preforms for composite materials that exhibit an improved ability to be shaped into a curved shape required in various structures, including those used in aeronautic and space applications, architectural structures, automobiles, ships and other applications in which mechanical strength is of significant importance.

Hereinafter, the term "dry preform" is used to mean a fiber-made structure that has not been impregnated with a resin so that it can be formed into a desired shape by various forming processes including resin transfer molding (RTM), resin film infusion (RFI) and vacuum assist resin transfer molding (VaRTM).

2. Description of the Related Art

Lightweightness and high strength are general requirements for structures used in aircrafts and spacecrafts, architectural structures, automobiles, ships and other applications in which significant mechanical strength is required.

Traditionally, structural materials of airplanes, in particular those used to form curved structures and structures with continuously varying thicknesses and widths, have been formed of metal materials to provide a mechanical strength required for the particular structure. A large number of parts of significant weight must be used in these structures to provide a necessary strength by metal materials, adding to the weight of the airplane. Not only does this impose a significant limit on the design of airplanes, but it also leads to a considerable increase in the fuel consumption during actual flights of an airplane. For these reasons, developing lightweight materials has been a key factor in designing and manufacturing airplanes as well as in minimizing the operational costs of airplanes.

Many of recent studies conducted on structural materials of airplanes are directed to the development of fiber-reinforced composite materials with a high specific strength. Such materials are generally produced by impregnating a proper fiber reinforcement, such as glass fiber, aramide fiber, and carbon fiber, with an epoxy resin or other polymer matrices. Many of these materials have actually been put to use. Composite materials are considered superior to metal materials because of their high specific strength and high specific rigidity. Their anisotropic property, a unique characteristic of fiber reinforced material, also permits a high degree of freedom in designing different structures. Furthermore, composite materials are suitable for making a large structural unit as a single piece and can thus permit a significant reduction in the number of parts and costs.

To manufacture these composite materials, a technique is known in which a fiber-reinforced material is obtained by placing a plurality of pipes along the direction of the thickness of the material in a pattern corresponding to a desired shape, stringing strands of fiber reinforcement from one pipe to another in a zigzag fashion, and replacing the pipes with fibers that extend along the direction of the thickness to hold the strands of fiber reinforcement together (See, for example, Japanese Patent Laid-Open Publication No. Sho 59-47464). This technique, however, is not efficient since the strands of reinforcement fiber in a zigzag fashion need to be strung one at a time, which takes a considerable amount of time. Replacing the pipes with strands of fiber reinforcement that extend across the thickness further adds to the time and costs required by the process.

Also, a technique is known for producing a fiber-reinforced curved material with a complex cross-sectional shape (See, for example, descriptions of U.S. Pat. No. 5,914,002 and accompanying drawings). In this technique, strands of fiber reinforcements are arranged along straight lines and no strands are aligned to the desired curve. The fiber-reinforced material produced in this manner does not have sufficient mechanical strength.

When it is desired to form a fiber reinforced body that has a complex cross-sectional shape, such as a ring or any other curved shape, part or all of which is formed by a curve, the hand lay-up process for instance is employed. In this process, a material called prepreg, which is a fiber reinforcement pre-impregnated with a resin, is cut into small pieces of sheets, which are overlaid on top of one another to form a body of desired shape (See, for example, Japanese Patent Laid-Open Publication No. Hei 07-081566). A drawback with this technique is that most of the process needs to be carried out manually: the process is too complicated to be automated. This technique involves too many steps and requires significant amounts of time. Also, materials are wasted in large quantity in this process. Thus, the overall productivity of the process remains low. In this process, reinforcing fibers are provided in the form of ring-shaped or curved short fragments. This not only results in an insufficient mechanical strength of the structural material obtained by the process, as compared to structural materials reinforced by continuous strands of fiber reinforcement, but it also leads to a significantly increased cost.

In another technique for producing a fiber-reinforced material, strands of fiber reinforcement are strung to form a desired fiber arrangement with predetermined width and thickness, and the resulting fiber arrangement is unified, for example, by stitching to form a desired fiber-reinforced material (See, for example, description of U.S. Pat. No. 5,809,805 and accompanying drawings). Essentially, this technique is designed to produce intermediate preform substrates, which are subsequently formed into the final shape. Thus, it is difficult to directly obtain desired shaped products using this technique alone since the intermediate substrates require additional processing, such as cutting and overlaying, before the desired final shape is achieved. This makes the process rather complicated and costly.

A technique, known as the automated tape lamination (ATL) or the fiber placement process, that also makes use of a prepreg material is in practical use in the production of large components that have curved surfaces, such as those used as skin materials of aircrafts and rockets (See, for example, description of U.S. Pat. No. 6,096,164 and accompanying drawings). One disadvantage of this technique is that it cannot be used to make shaped bodies with an I-, L-, T-, hat-shaped or other complex cross-sections.

Processes that utilize fiber-reinforced fabrics are also known. In these techniques, fabrics are formed into a disk, a helix or other desired shapes (See, for example, Japanese Patent Laid-Open Publication Nos. Sho 57-133242, Hei 10-217263, Hei 09-207236, 2001-073241, Hei 07-133548, and 2002-3280). Each of these techniques, however, requires an extra step to form fibers into a fabric and thus is not cost-efficient. Also, these techniques involve many processes such as cutting and overlaying fabrics and require a significant amount of effort in precisely controlling the number of fibers in different areas of a fabric. As a result, each of these techniques tends to be costly.

Fiber-reinforced fabrics that take advantage of strands of fiber reinforcement with a complex cross-sectional shape, such as I-, H-, or T-shaped cross-section, are also known (See, for example, Japanese Patent Laid-Open Publication No. Sho 57-133241). Being a fabric woven on a weaving machine, this material permits only a limited number of arrangements of strands of fiber reinforcement: it is difficult to arrange fibers in a desired area and in a desired orientation. In addition, strands of fiber reinforcement aligned in the fabric material are crimped, leading to the insufficient strength of the material.

Techniques are also known in which fiber structure of a fabric is altered to make a curved structure (See, for example, Japanese Patent Laid-Open Publication Nos. Sho 63-120153 and Hei 02-191742). Fibers are also crimped in the fabric material used in these techniques and, as a result, the strength of the material is reduced. The techniques also involve many steps. Thus, these techniques are not suitable for mass production and can only achieve limited shapes of the products.

A process is also known that makes use of a braided material, which consists of interlaced strands of fiber reinforcement, to make a composite material (See, for example, Japanese Patent Laid-Open Publication No. Hei 10-290851). Although a typical braided material is deformable since it consists of fibers that are directed in two intersecting directions and are interlaced with each other, the deformability of the material is lost when fibers aligned in other directions are included to restrict the movement of the interlaced fiber reinforcements. Furthermore, the additional fibers may increase the unfavorably oriented strands of fiber reinforcement. Accordingly, not only does the process permit a limited degree of freedom in designing shaped products, but the weight and the size of the products are also increased in the process. Fibers are crimped in any of fabrics, braids and knits, reducing the strength of the products and making the process just as costly as the process using fabric. In addition, the strength required for a particular design of the structural material may sometimes not be obtained. Each of these problems has contributed to the delay in application of composite materials to commercial aircrafts (See, for example, Japanese Patent Laid-Open Publication No. 2000-328392).

BRIEF SUMMARY OF THE INVENTION

Accordingly, it is an objective of the present invention to provide a novel method and an apparatus for producing preforms for making a composite material. The method and the process of the present invention can eliminate the above-described problems and can achieve a high degree of freedom in designing dry preforms for composite materials, which include a curved shape and a complex cross-sectional shape and are typically made by stringing strands of fiber reinforcement and holding them together. The process and the apparatus of the present invention require less time and fewer steps, waste less material, are less costly and less susceptible to crimping of fibers, and can make denser and stronger preforms, as compared to conventional technologies.

To achieve the above-described objective of the present invention, a first aspect of the method of the present invention for producing a dry preform for a composite material for use as a structural material resides in that before or after unifying a reinforcing filament assembly including a first fiber reinforcement layer and a second fiber reinforcement layer, the reinforcing filament assembly is deformed in and/or out of plane to form the dry preform with a complex cross-sectional shape. The first fiber reinforcement layer is formed by stringing a first set of parallel strands of fiber reinforcement over a part or all of the plane within any shape along a predetermined axis contained within the plane, and the second fiber reinforcement layer is formed by stringing a second set of parallel strands of fiber reinforcement over the plane of the shape at an angle with respect to the axis.

A second aspect of the method of the present invention for producing a dry preform for a composite material for use as a structural material resides in that, in the above-described first aspect, the step of, before or after unifying the reinforcing filament assembly including the first fiber reinforcement layer and the second fiber reinforcement layer, deforming the reinforcing filament assembly in and/or out of plane is performed to form the dry preform with the complex cross-sectional shape and continuously varying thickness and/or width, wherein the first fiber reinforcement layer is formed by stringing the first set of parallel strands of fiber reinforcement over a part or all of the plane within any shape with continuously varying thickness and/or width along the predetermined axis contained within the plane, and the second fiber reinforcement layer is formed by stringing the second set of parallel strands of fiber reinforcement over the plane of the shape at the angle with respect to the axis.

A third aspect of the method of the present invention for producing a dry preform for a composite material for use as a structural material resides in that, in the above-described first or the second aspect, after unifying the reinforcing filament assembly including the first fiber reinforcement layer and the second fiber reinforcement layer, the reinforcing filament assembly is deformed out of plane to form the dry preform with the complex cross-sectional shape and a curved profile, wherein the first fiber reinforcement layer is formed by stringing the first set of parallel strands of fiber reinforcement over a part or all of the plane within any curved shape along a curved axis contained within the plane, and the second fiber reinforcement layer is formed by stringing the second set of parallel strands of fiber reinforcement over the plane of the shape at an angle with respect to the curved axis.

A fourth aspect of the method of the present invention for producing a dry preform for a composite material for use as a structural material resides in that, in the above-described first or the second aspect, the method comprises the steps of:

unifying the reinforcing filament assembly including at least one first fiber reinforcement layer and a plurality of second fiber reinforcement layers, wherein the first fiber reinforcement layer is formed by stringing a first set of parallel strands of fiber reinforcement over the part of the plane within the any shape along a straight axis contained within the plane, the second fiber reinforcement layer is formed by stringing a second set of parallel strands of fiber reinforcement over the plane of the shape at an angle with respect to the straight axis;

bending the reinforcing filament assembly consisting of the first fiber reinforcement layer and the second fiber reinforcement layers onto the same curvature on the same plane; and deforming out of plane a portion that consists solely of the second fiber reinforcement layers to form the dry preform having a complex cross-sectional shape and a curved profile.

A fifth aspect of the method of the present invention for producing a dry preform for a composite material for use as a structural material resides in that, in the above-described first or the second aspect, deforming the reinforcing filament assembly including the first fiber reinforcement layer and the second fiber reinforcement layer in plane, the first fiber reinforcement layer formed by stringing the first set of parallel strands of fiber reinforcement over a part or all of the plane within any straight shape along a straight axis contained within the plane, the second fiber reinforcement layer formed by stringing the second set of parallel strands of fiber reinforcement over the plane of the shape at the angle with respect to the straight axis;

unifying the deformed reinforcing filament assembly with curved shape; and deforming the unified reinforcing filament assembly out of plane to form the dry preform with the complex cross-sectional shape and a curved profile.

A sixth aspect of the method of the present invention for producing a dry preform for a composite material for use as a structural material resides in that, in the above-described fourth aspect, a plurality of the dry preforms having a complex cross-sectional shape and a curved profile are used in combination, such that the first fiber reinforcement layer extends throughout a part of surface of the dry preform, the dry preform obtained by the method comprising the steps of:

unifying the reinforcing filament assembly including at least one first fiber reinforcement layer and a plurality of second fiber reinforcement layers, wherein the first fiber reinforcement layer is formed by stringing the first set of parallel strands of fiber reinforcement over the part of the plane within the shape along a straight axis contained within the plane, the second fiber reinforcement layer is formed by stringing the second set of parallel strands of fiber reinforcement over the plane of the shape at an angle with respect to the straight axis;

bending the reinforcing filament assembly consisting of the first fiber reinforcement layers and the second fiber reinforcement layers onto the same curvature on the same plane; and deforming out of plane a portion that consists solely of the second fiber reinforcement layers.

A seventh aspect of the method of the present invention for producing a dry preform for a composite material for use as a structural material resides in that, in the above-described sixth aspect, a tension acting upon the strands of fiber reinforcement is maintained at a constant value, before or after the reinforcing filament assembly is deformed in plane to form the dry preform with a curved profile without unifying the reinforcing filament assembly including the first fiber reinforcement layer and the second fiber reinforcement layer, wherein the first fiber reinforcement layer is formed by stringing the first set of parallel strands of fiber reinforcement over a part or all of the plane within the straight shape along a straight axis contained within the plane, and the second fiber reinforcement layer is formed by stringing the second set of parallel strands of fiber reinforcement over the plane of the shape at the angle with respect to the straight axis.

An eighth aspect of the method of the present invention for producing a dry preform for a composite material for use as a structural material resides in that, in the above-described first or second aspect, or sixth or seventh aspect, proper means selected from stitching, knitting, tufting, needle punch, and thermoplastic resin is used either independently or in combination, in the step of unifying the reinforcing filament assembly including the first fiber reinforcement layer and the second fiber reinforcement layer, wherein the first fiber reinforcement layer is formed by stringing the first set of parallel strands of fiber reinforcement over a part or all of the plane within the shape along the predetermined axis contained within the plane, and the second fiber reinforcement layer is formed by stringing the second set of parallel strands of fiber reinforcement over the plane of the shape at the angle with respect to the axis.

A ninth aspect of the method of the present invention for producing a dry preform for a composite material for use as a structural material resides in that, in the above-described third aspect, proper means selected from stitching, knitting, tufting, needle punch, and thermoplastic resin is used either independently or in combination, in the step of unifying the reinforcing filament assembly including the first fiber reinforcement layer and the second fiber reinforcement layer, wherein the first fiber reinforcement layer is formed by stringing the first set of parallel strands of fiber reinforcement over a part or all of the plane within the shape along the predetermined axis contained within the plane, and the second fiber reinforcement layer is formed by stringing the second set of parallel strands of fiber reinforcement over the plane of the shape at the angle with respect to the axis.

A tenth aspect of the method of the present invention for producing a dry preform for a composite material for use as a structural material resides in that, in the above-described fourth aspect, proper means selected from stitching, knitting, tufting, needle punch, and thermoplastic resin is used either independently or in combination, in the step of unifying the reinforcing filament assembly including the first fiber reinforcement layer and the second fiber reinforcement layer, wherein the first fiber reinforcement layer is formed by stringing the first set of parallel strands of fiber reinforcement over a part or all of the plane within the shape along the predetermined axis contained within the plane, and the second fiber reinforcement layer is formed by stringing the second set of parallel strands of fiber reinforcement over the plane of the shape at the angle with respect to the axis.

An eleventh aspect of the method of the present invention for producing a dry preform for a composite material for use as a structural material resides in that, in the above-described fifth aspect, proper means selected from stitching, knitting, tufting, needle punch, and thermoplastic resin is used either independently or in combination, in the step of unifying the reinforcing filament assembly including the first fiber reinforcement layer and the second fiber reinforcement layer, wherein the first fiber reinforcement layer is formed by stringing the first set of parallel strands of fiber reinforcement over a part or all of the plane within the shape along the predetermined axis contained within the plane, and the second fiber reinforcement layer is formed by stringing the second set of parallel strands of fiber reinforcement over the plane of the shape at the angle with respect to the axis.

A first aspect of the apparatus of the present invention for producing a dry preform for a composite material for use as a structural material resides in that the apparatus comprises: a plurality of pin members, each including a predetermined number of pins for stringing strands of fiber reinforcement, the pin members being arranged opposite one another and spaced apart by a distance corresponding to a width of the dry preform; a space maintaining member for connecting the pin members to one another along a length of the dry preform in such a manner that the pin members can move toward or away from one another, and for keeping the distance between the opposed pin members; and an end pin member provided on at least one longitudinal end thereof and extending along the width of the apparatus, and including a predetermined number of pins, the end pin member being able to pivot about a center as viewed along the width thereof so that a tension that is caused when the reinforcing filament assembly is deformed remains even. The apparatus is capable of deforming to describe an arch about its longitudinal axis.

A second aspect of the apparatus of the present invention for producing a dry preform for a composite material for use as a structural material resides in that the apparatus comprises: a set of fiber reinforcement guide pipes for stringing a first fiber reinforcement layer and a second fiber reinforcement layer, the number of the guide pipes corresponding to the number of strands of fiber reinforcement or the number of rows of strands of fiber reinforcement that are strung at a time; a set of bars for securing the set of fiber reinforcement guide pipes and keeping the distance between the guide pipes; an actuator for driving the set of fiber reinforcement guide pipes and the set of bars to either move the guide pipes and the bars along a straight axis or move the bars at an angle with respect to the straight axis; and a creel unit for feeding the strands of fiber reinforcement to the set of fiber reinforcement guide pipes.

BRIEF DESCRIPTION OF THE DRAWINGS

FIGS. 6 consists of a series of illustrative partial front views showing the manner in which the change in tension that acts upon strands of fiber reinforcement upon deformation of another apparatus for producing dry preforms for an composite material in an arched state is minimized in accordance with another embodiment of the present invention, wherein:

FIG. 7 consists of a series of illustrative partial front views showing the manner in which the change in tension that acts upon strands of fiber reinforcement upon deformation of yet another apparatus for producing dry preforms for an composite material in an arched state is minimized in accordance with yet another embodiment of the present invention, wherein:

FIG. 8(B) is a schematic side view showing another fiber reinforcement string apparatus in another embodiment of the present invention.

FIG. 10 consists of a series of schematic plan views illustrating the manner in which strands of fiber reinforcement are strung in one embodiment of the present invention to obtain a dry preform for a composite material having a sloped profile, wherein:

DETAILED DESCRIPTION OF THE INVENTION

Several embodiments of a method and an apparatus for producing a dry preform for making a composite material in accordance with the present invention (which is referred to simply as "dry preform") will now be described with reference to the accompanying drawings.

Figure 1:
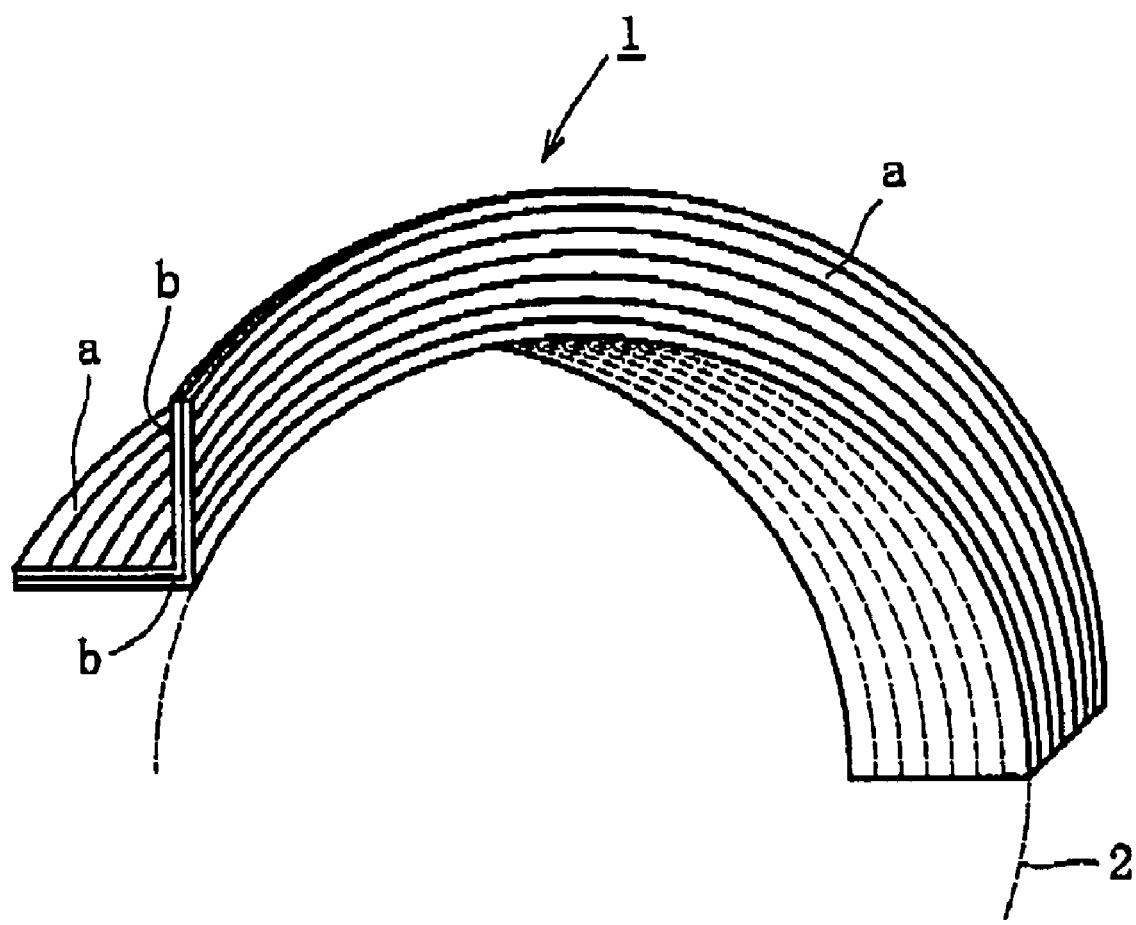
FIG. 1 is a schematic perspective view showing a dry preform for a composite material produced by a method in accordance with the present invention.

Referring to FIG. 1, a typical configuration of a dry preform produced in accordance with the present invention is shown schematically along with a typical arrangement of fibers. Shown in FIG. 1 in a perspective view is a dry preform 1, which consists of a fiber-reinforcement layer a, in which strands of fiber reinforcement are arranged along a curved axis 2, and a fiber-reinforcement layer b, in which strands of fiber reinforcement are directed at an angle with respect to the axis 2. The fiber reinforcement layers a and b are held together to form the dry preform 1, which has an L-shaped cross section and a curved shape extending along the axis 2. In the dry preform 1, the fiber reinforcement layer a, which includes strands of fiber reinforcement directed along the axis 2, and the fiber reinforcement layer b, which includes strands of fiber reinforcements directed at an angle with respect to the axis 2, extend throughout the dry preform 1. A process for producing such a dry preform 1 is described in the following.

Figure 2A:
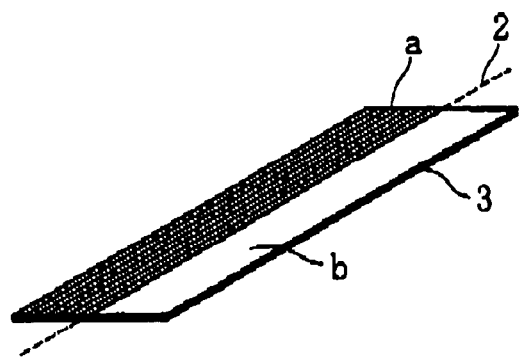
FIG. 2(A) is a schematic perspective view showing a planar reinforcing filament assembly prior to being formed into the dry preform shown in FIG. 1.

A planar reinforcing filament assembly 3 as shown in FIG. 2(A) is constructed by first arranging the fiber reinforcement layer a, which includes strands of fiber reinforcement extending straight along the axis 2, to cover half the area of the planar reinforcing filament assembly 3, arranging the fiber reinforcement layer b, which includes strands of fiber reinforcement directed at an angle with respect to the axis 2, to cover the entire area of the planar reinforcing filament assembly 3, and subsequently bringing together the fiber reinforcement layers a and b to form the planar reinforcing filament assembly 3.

Figure 2B:
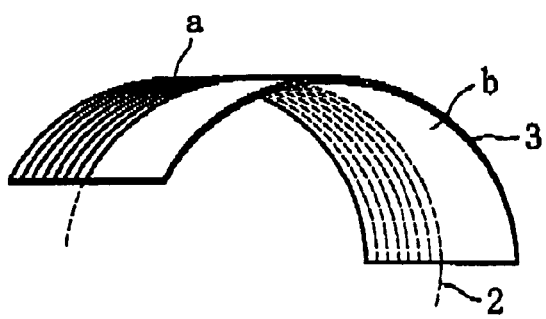
FIG. 2(B) is a schematic perspective view showing the reinforcing filament assembly of FIG. 2(A) deformed to have the same curvature on the same plane.

The planar reinforcing filament assembly 3 shown in FIG. 2(A) is then deformed out of plane, along with the curved axis 2, to have the same curvature on the same plane and assume the curved shape as shown in FIG. 2(B).

Figure 2D:
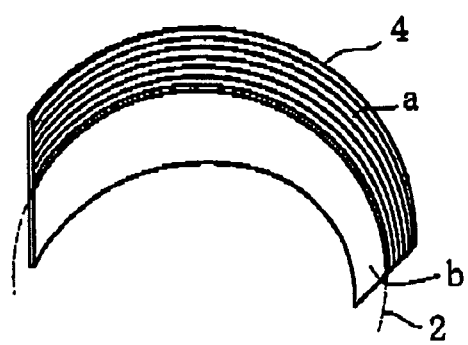
FIG. 2(D) is a perspective view showing another piece of reinforcing filament assembly that has a contrast construction of fiber reinforcements with respect to the reinforcing filament assembly of FIG. 2(A) and is required to make the dry preform for a composite material shown in FIG. 1.
Figure 2C:
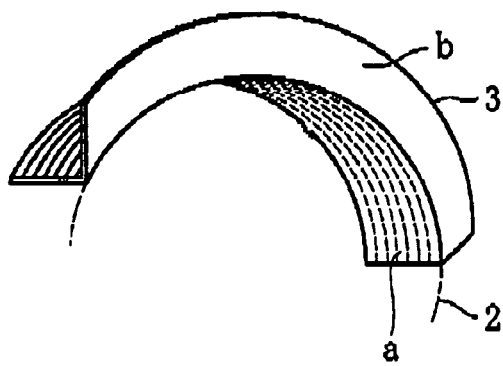
FIG. 2(C) is a schematic perspective view showing the reinforcing filament assembly of FIG. 2(B), part of which has been deformed out of plane.

Subsequently, the area of the curved reinforcing filament assembly 3 that is formed solely of the fiber reinforcement layer b is deformed out of plane to form a flanged portion, so that the resulting reinforcing filament assembly 3 has an L-shaped cross-section with the fiber reinforcement layer a, arranged along the axis 2, covering the other half of the curved shape as shown in FIG. 2(C).

Referring to FIG. 2(D), a reinforcing filament assembly 4 is formed by first arranging the fiber reinforcement layer a, which has previously been deformed along the curved axis 2, in a position shown in FIG. 2(D), and arranging the fiber reinforcement layer b, oriented at an angle with respect to the curved axis 2, over the entire area of the reinforcing filament assembly 4, and the reinforcing filament assembly 4 is unified. The area of the reinforcing filament assembly 4 that is formed solely of the fiber reinforcement layer b and does not include the fiber reinforcement layer a directed along the axis 2 can be deformed out of plane from the state shown in FIG. 2(D) to form a flanged portion, resulting in the state of the reinforcing filament assembly 4 shown in FIG. 2(E), which has an L-shaped cross-section and half of which includes the fiber reinforcement layer a directed along the axis 2.

Figure 2E:
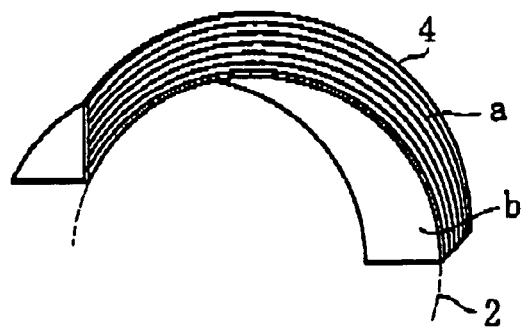
FIG. 2(E) is a schematic perspective view showing another piece of reinforcing filament assembly that has a contrast construction of fiber reinforcements with respect to the reinforcing filament assembly of FIG. 2(C) and is required to make the dry preform for a composite material shown in FIG. 1.

The resultant reinforcing filament assemblies 3 and 4 are shown in FIG. 2(c) and FIG. 2(E), respectively. As shown, the reinforcing filament assemblies 3 and 4 each include an L-shaped cross-section and the fiber reinforcement layer a that covers half of each assembly. The reinforcing filament assemblies 3 and 4 are held together by means of stitching, knitting, tufting, needle-punch, thermoplastic resin or any combination thereof. In this manner, the dry preform 1 as shown in FIG. 1 is obtained that has an L-shaped cross-section and a shape bent along the axis 2. The fiber reinforcement layer a, which includes strands of fiber reinforcement directed along the axis 2, and the fiber reinforcement layer b, which includes strands of fiber reinforcements directed at an angle with respect to the axis 2, each extend throughout the dry preform 1.

Figure 3:
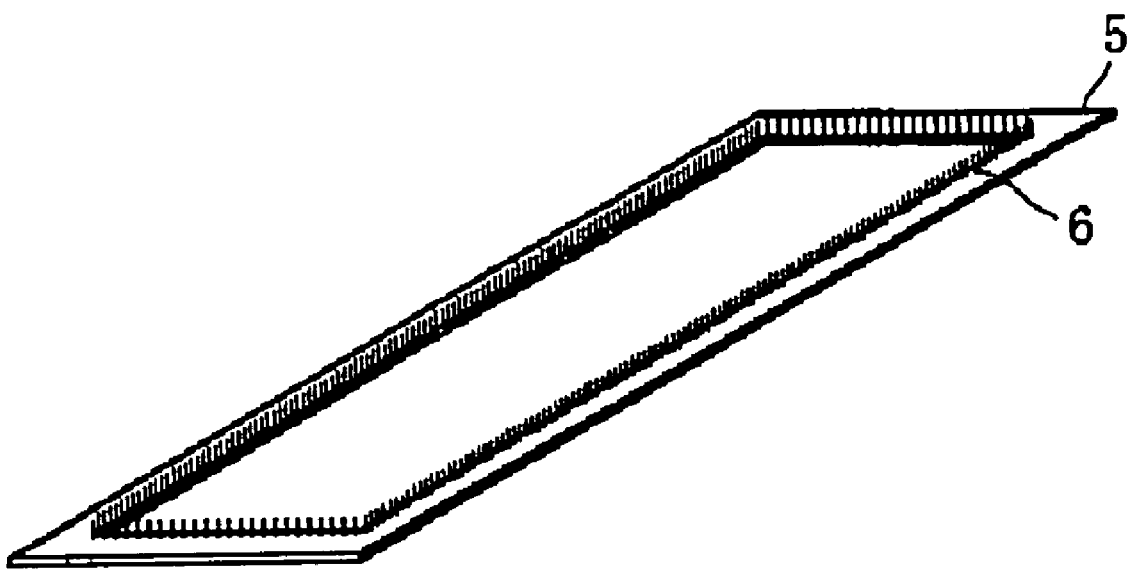
FIG. 3 is a schematic perspective view showing a jig with pins for stringing strands of fiber reinforcement in accordance with one embodiment of the present invention.

Referring now to FIG. 3, a fiber reinforcement string jig 5 for stringing strands of fiber reinforcement to form the fiber reinforcement layers a and b is shown in a perspective view. The fiber reinforcement layers a and b together form the planar reinforcing filament assembly 3 shown in FIG. 2(A). The fiber reinforcement string jig 5 includes a plurality of upright, equally spaced pins 6, so that the resulting fiber reinforcement layers a and b each have a rectangular shape.

Figure 4:
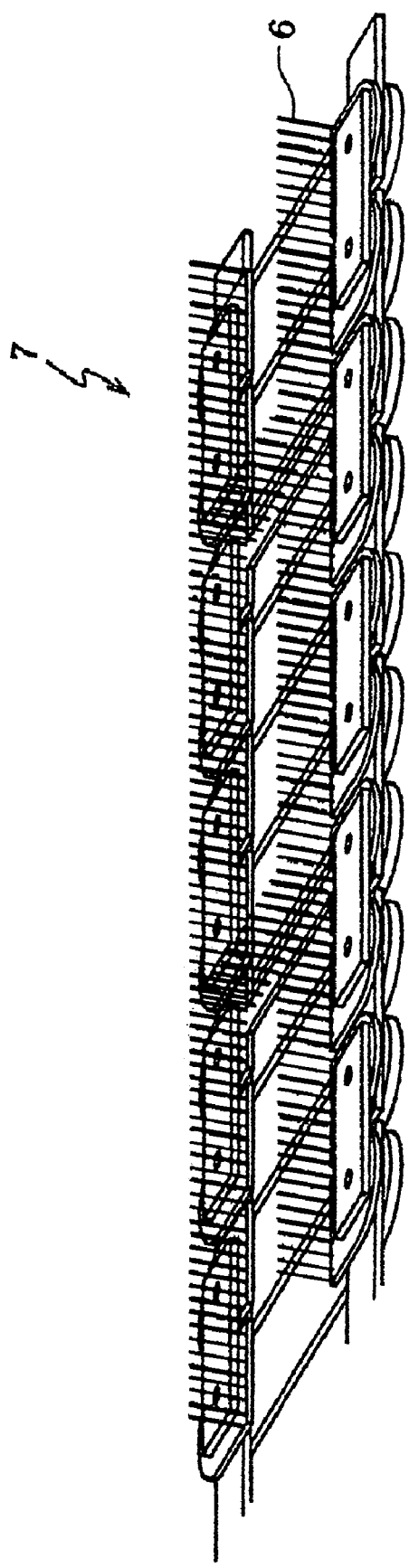
FIG. 4 is a partial perspective view showing major components of an apparatus for producing dry preforms for a composite material in accordance with one embodiment of the present invention.

To make a reinforcing filament assembly 4, such as the one shown in FIG. 2(D), that is contained within a plane and has a bent shape, a fiber reinforcement string jig 7 as shown in FIG. 4 may be used. The fiber reinforcement string jig 7, when in a straight position, allows strands of fiber reinforcement to be strung across the pins 6 to form the fiber reinforcement layers a and b. The string jig 7 can then be deformed, within the same plane, to assume the curved shape as shown in FIG. 5 without bringing the reinforcing filament assemblies together.

Figure 5:
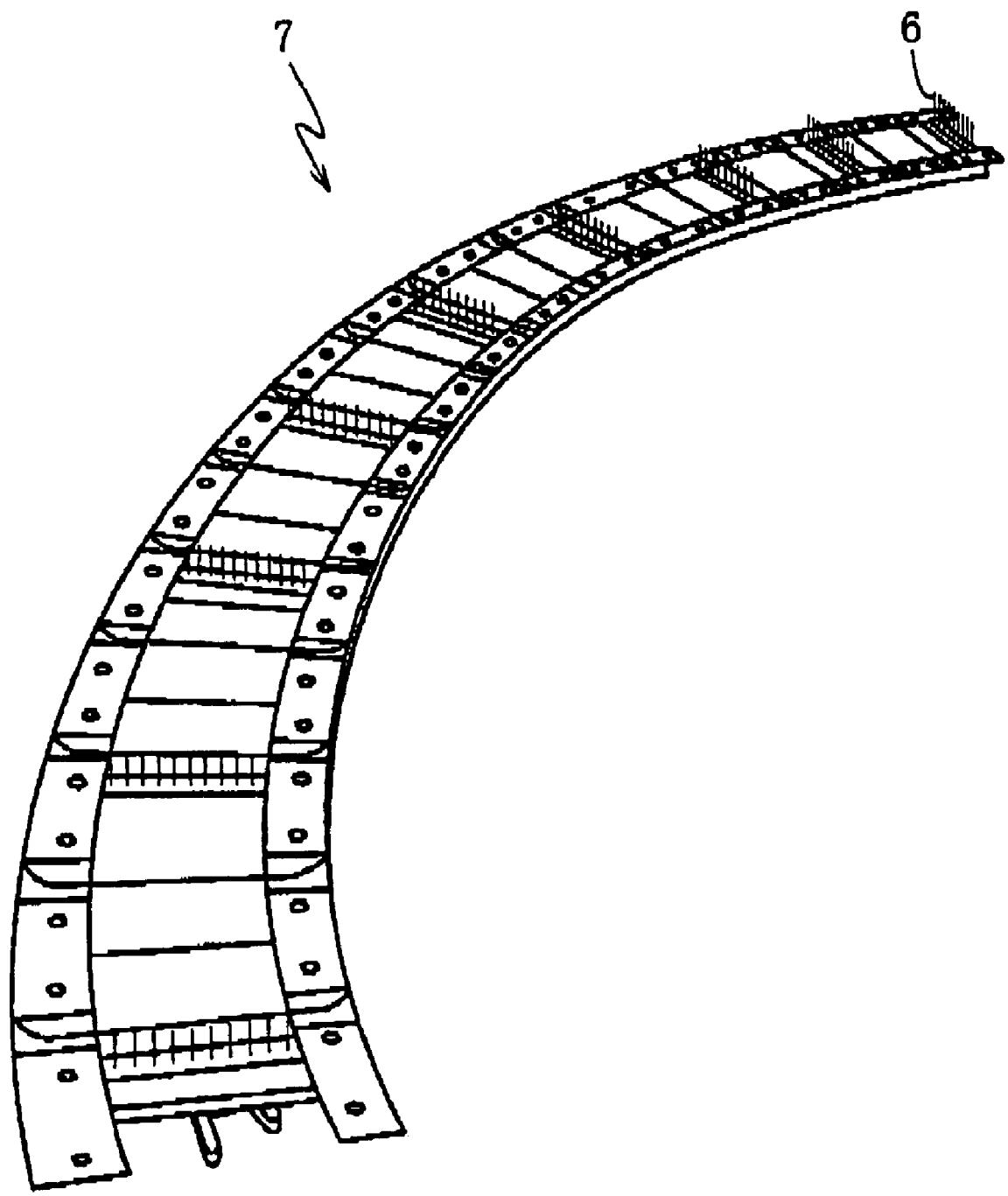
FIG. 5 is a schematic perspective view showing the apparatus of FIG. 4 for producing dry preforms for a composite material in an arched state.
Figure 6A:
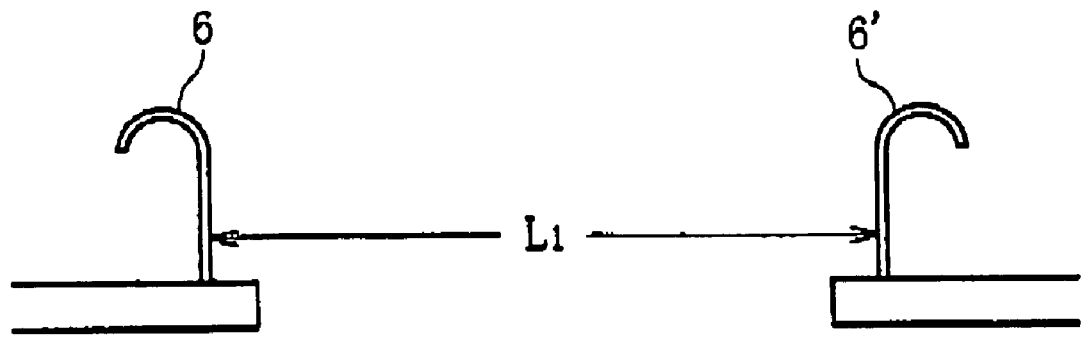
FIG. 6(A) illustrates a state in which pins are free.
Figure 6B:
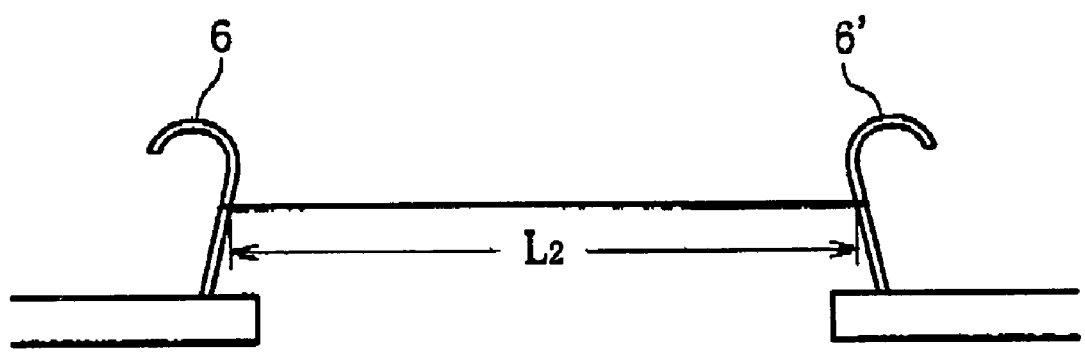
FIG. 6(B) illustrates a state in which a strand of fiber reinforcement is strung across the pins.
Figure 6C:
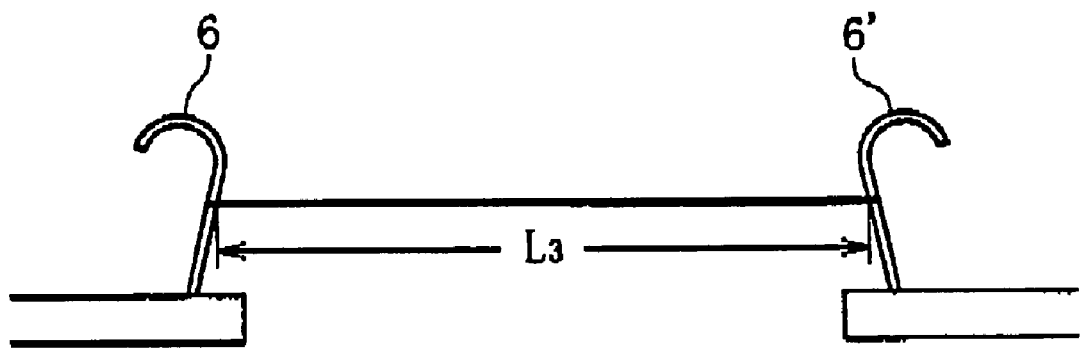
FIG. 6(C) illustrates a state in which the apparatus has been deformed in an arched state.

As shown in FIG. 6, a pair of pins 6, 6' may be used in the fiber reinforcement string jig 7 shown in FIGS. 4 and 5 to string strands of fiber reinforcement to form the fiber reinforcement layers a and b across the pins 6, 6'. FIG. 6 is a cross-sectional view of the fiber reinforcement string jig 7. As shown in FIG. 6(A), the distance between the pin 6 and the pin 6' is L1 before a strand of fiber reinforcement is strung. The pins 6, 6' are preferably formed of an elastic material, such as a spring or an elastomer, that can undergo elastic deformation when acted upon by the tension of the strand of fiber reinforcement upon stringing of the strand. When a strand of the fiber reinforcement is strung across the pins 6, 6', the distance between the pins 6, 6' changes to L2. Once the fiber reinforcement layer a and the fiber reinforcement layer b are strung in predetermined arrangements forming the reinforcing filament assembly, the reinforcing filament assembly is forced to deform in plane. Upon this, the distance between the pins 6 and 6' changes to L3. The pins 6, 6' then each undergo elastic deformation so that the tensions acting upon the fiber reinforcement layers a and b are maintained in a proper range.

Figure 7C:
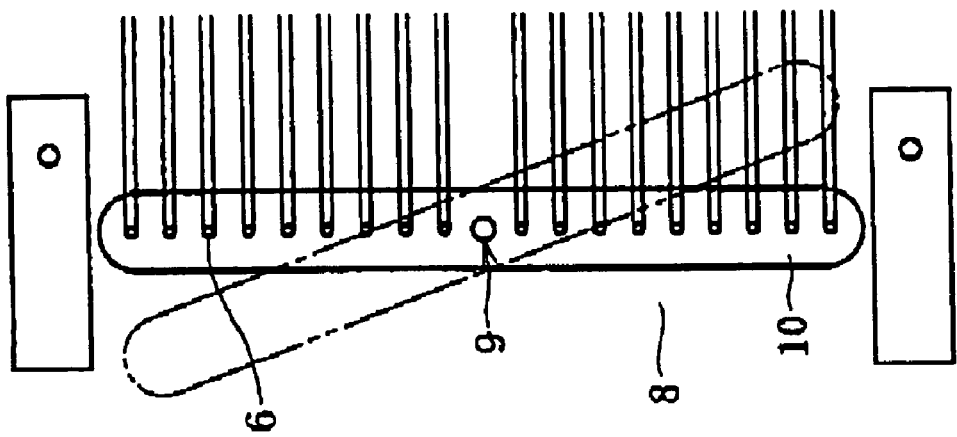
FIG. 7(C) illustrates a state after deformation of straight strands of fiber reinforcement in an arched state within the plane.
Figure 7B:
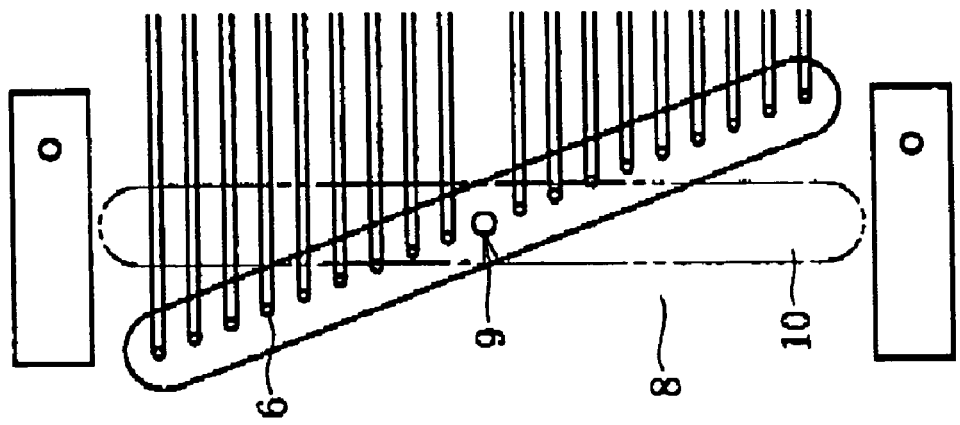
FIG. 7(B) illustrates a state prior to deformation of straight strands of fiber reinforcement in an arched state within a plane.
Figure 7A:
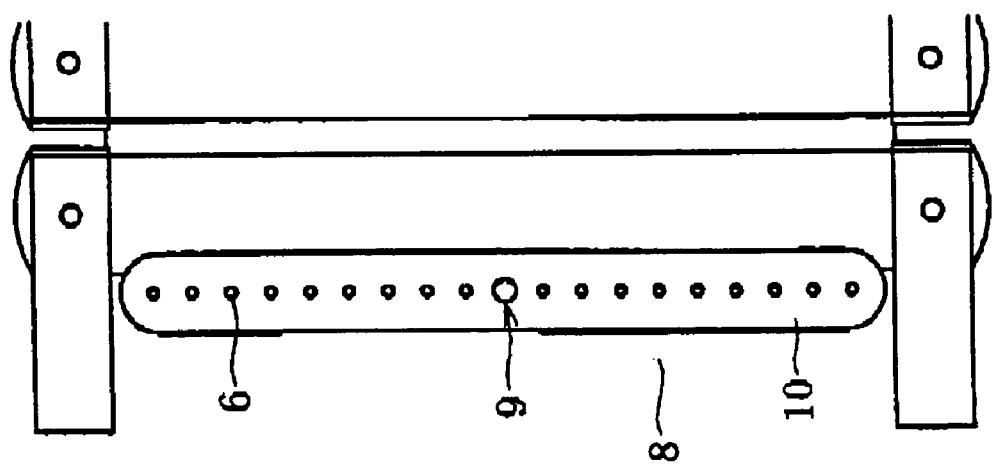
FIG. 7(A) illustrates a state prior to stringing straight strands of fiber reinforcement.

Shown in FIG. 7 is a tension control jig 8 for controlling the tension that acts upon the fiber reinforcement layer a when the reinforcing filament assembly, after it has been formed, is forced to deform on the fiber reinforcement string jig 7 to assume the curved configuration within the same plane. As the fiber reinforcement string jig 7 deforms while remaining in the same plane, the strands of fiber reinforcement that form the fiber reinforcement layer a will have different lengths between the outer region and the inner region of the curved shape. To compensate for this change in the lengths of the strands of the fiber reinforcement that form the fiber reinforcement layer a, an end pin member 10 is previously moved about a center point 9 from the state shown in FIG. 7(A) to the state shown in FIG. 7(B). As shown in FIG. 7(C), the end pin member 10 serves to ensure the smooth deformation of the reinforcing filament assembly within the same plane while preventing the fiber reinforcement layers a and b from being wrinkled upon deformation of each layer within the same plane.

Figure 8A:
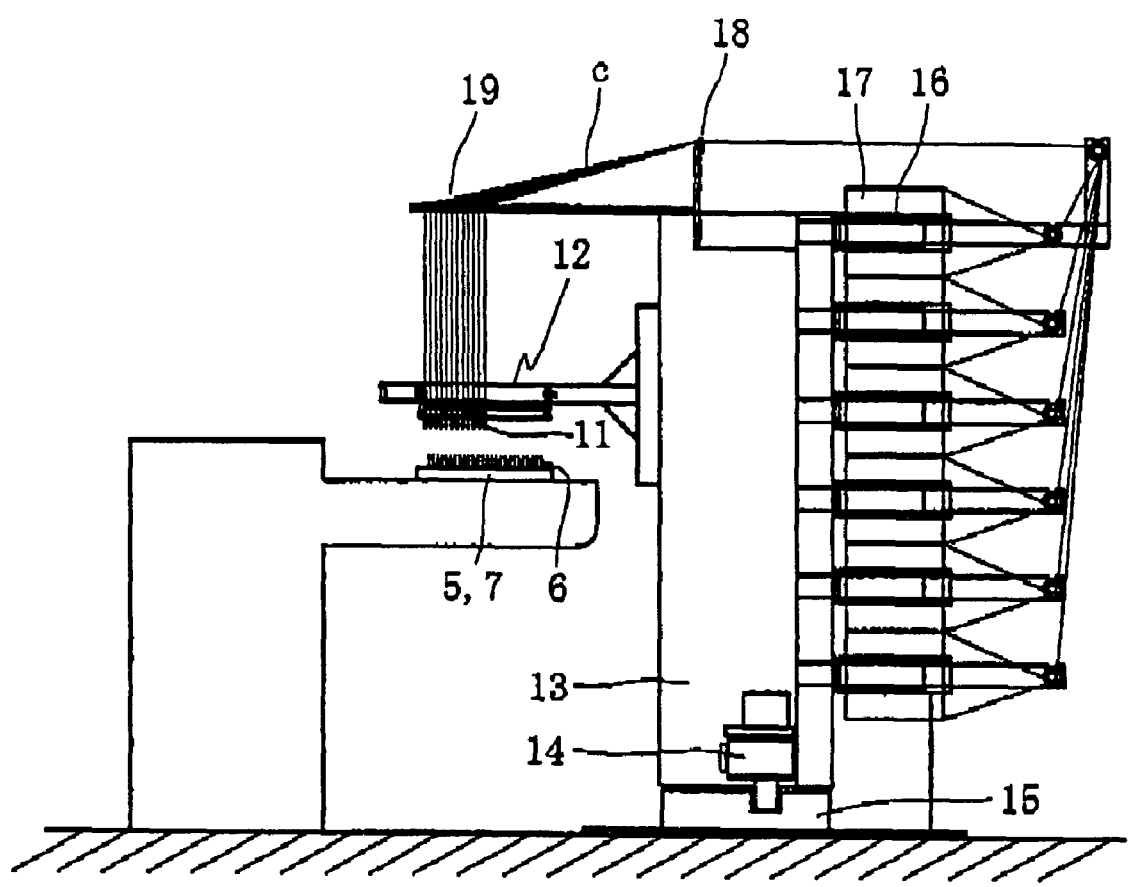
FIG. 8(A) is a schematic side view showing a fiber reinforcement string apparatus in one embodiment of the present invention.

Referring next to FIG. 8(A), a fiber reinforcement string apparatus for forming the fiber reinforcement layer a, which includes strands of the fiber reinforcement directed along the axis 2, on the fiber reinforcement string jig 5 or on the fiber reinforcement string jig 7 is shown in a side view. The fiber reinforcement string apparatus includes a row of fiber reinforcement guide pipes 11 with the number of the guide pipes 11 corresponding to the width of the fiber reinforcement layer a to be formed, a bar 12 which supports the equally spaced-apart guide pipes 11, and a movable portion 13 that supports the bar 12 and moves along the axis 2. The movable portion 13, as it is driven by an actuator 14, moves on a guide rail 15 along the axis 2. Mounted on the movable portion 13 on one side thereof is a creel unit 17, which includes a plurality of bobbins 16 each having a proper amount of a strand of fiber reinforcement c wound thereon. As the strand of fiber reinforcement c, fed from the creel unit 17, travels through guides 18, 19 and through the fiber reinforcement guide pipe 11, the movable portion 13 moves to string the strand of fiber reinforcement c across the upright pins 6 mounted on the fiber reinforcement string jig 5 or 7. In this manner, the fiber reinforcement string apparatus can efficiently form the fiber reinforcement layer a along the axis 2.

FIG. 8(B) is a side view of a fiber reinforcement string apparatus for stringing a string of fiber reinforcement c at an angle θ with respect to the axis 2, such that 0°<θ<180°. The fiber reinforcement string apparatus includes fiber reinforcement guide pipes 11 arranged to correspond to the pitch of pins 6, a bar 12 that supports the equally spaced-apart guide pipes 11, and an actuator 20 for driving the fiber reinforcement guide pipes 11 and the bar 12 to move them at an angle θ with respect to the axis 2, such that 0°<θ<180°. As the strand of fiber reinforcement c is fed from a creel unit 17, which includes bobbins 16, and travels through guides 18, 19 and then through the fiber reinforcement guide pipes 11, the actuator 20 moves as it strings the string of fiber reinforcement c in that direction across the upright pins 6 mounted on the fiber reinforcement string jig 5 and 7. In this manner, the fiber reinforcement string apparatus can efficiently string the strand of fiber reinforcement c.

Figure 9A:
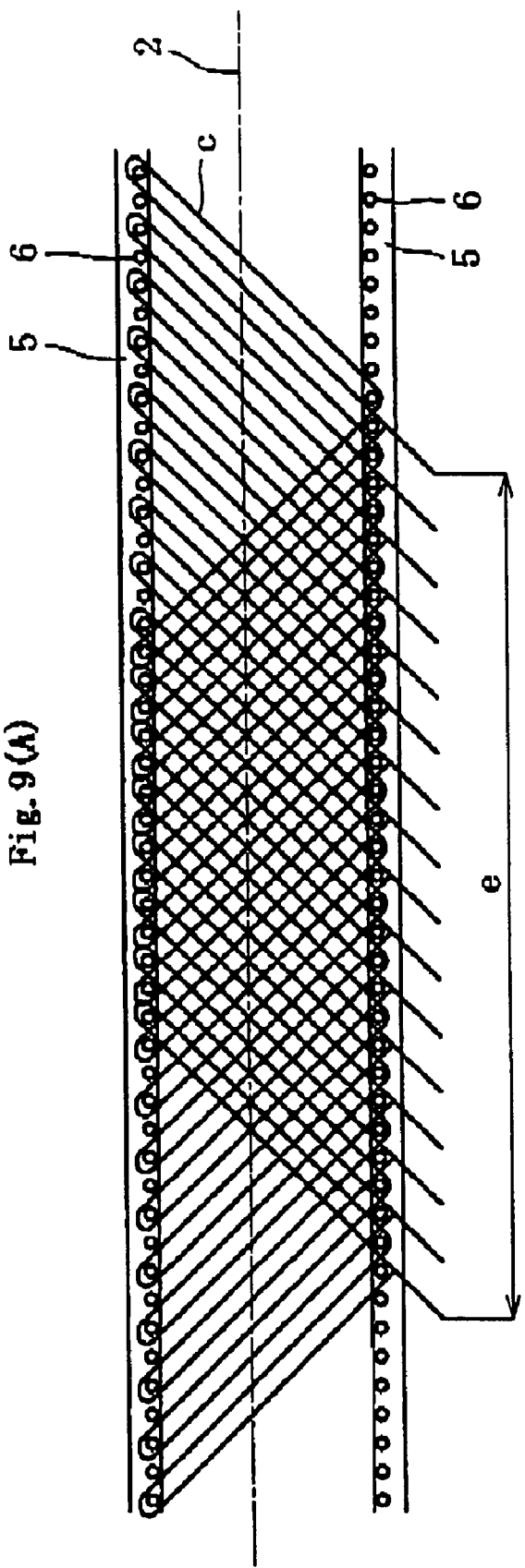
FIG. 9(A) is a schematic plan view illustrating a typical manner in which strands of fiber reinforcement are strung in one embodiment of the present invention.
Figure 9B:
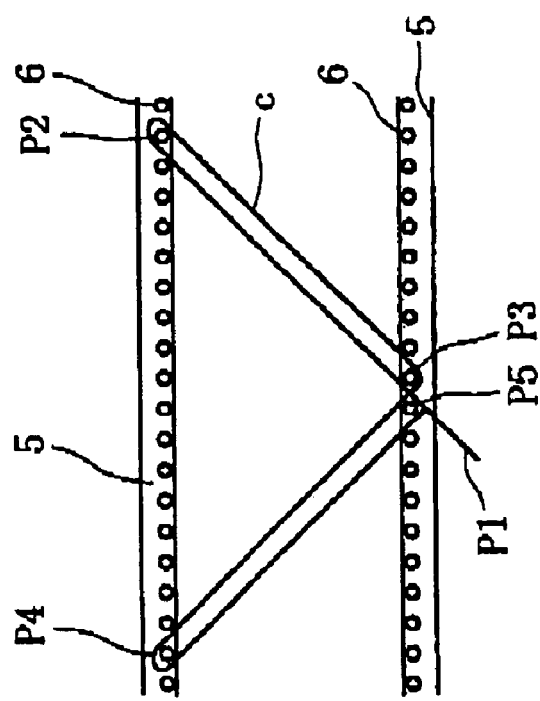
FIG. 9(B) is a schematic plan view illustrating the manner in which strands of fiber reinforcement are strung in one embodiment of the present invention.

Referring next to FIGS. 9(A) and 9(B), one example of the manner in which the fiber reinforcement string apparatus shown in FIG. 8(B) strings strands of the fiber reinforcement c is depicted in a plan view. In FIG. 9(A), the distance e indicates a distance between adjacent fiber reinforcement guide pipes 11 shown in FIG. 8(B). The movement of one of the fiber reinforcement guide pipes 11 that are arranged within a range e is depicted in FIG. 9(B). As shown in FIG. 9(B), the stringing of a strand of fiber reinforcement c begins at P1. The strand is then sequentially strung to P2, P3, and P4, and when the stringing proceeds to P5, the strand completes a V-shape pattern. This step is repeated until the desired pattern of the fiber reinforcement is obtained.

FIG. 10 briefly depicts a process for producing a dry preform having a continuously changing or stepwise profile. In this process, a first set of strands of the fiber reinforcement c is first strung to the pins 6 on the fiber reinforcement string jig 5 in the manner shown in FIG. 10(A). Then, a second set of strands of the fiber reinforcement c having a different direction from that of FIG. 10(A) is strung in the manner shown in FIG. 10(B). This is followed by stringing of longitudinal strands of the fiber reinforcement c as shown in FIG. 10(C).

Figure 10A:
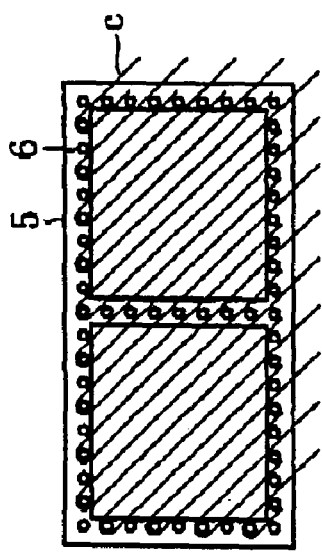
FIG. 10(A) illustrates a state in which a set of strands of fiber reinforcement are strung in one direction on a fiber reinforcement string jig.
Figure 10B:
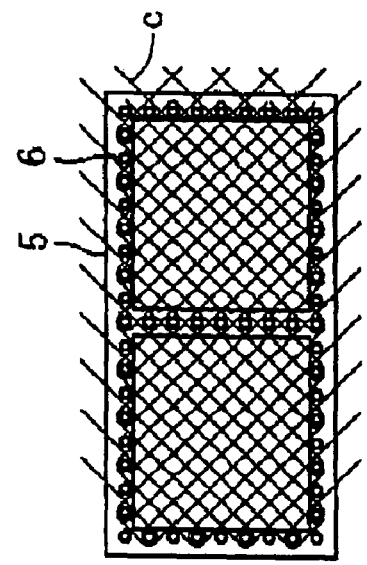
FIG. 10(B) illustrates a state in which another set of strands of fiber reinforcement are strung on the fiber reinforcement string jig in a direction different from that of the strands shown in FIG. 10(A)
Figure 10C:
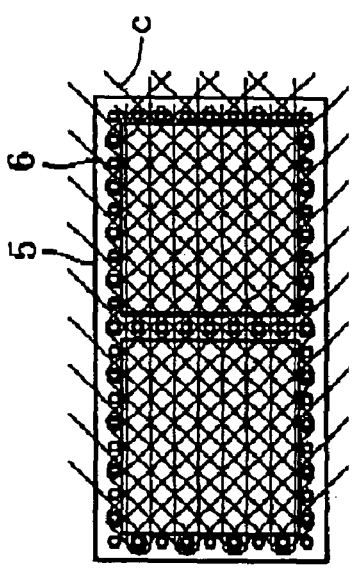
FIG. 10(C) illustrates a state in which still another set of strands of fiber reinforcement are strung on the fiber reinforcement string jig in a longitudinal direction.
Figure 10D:
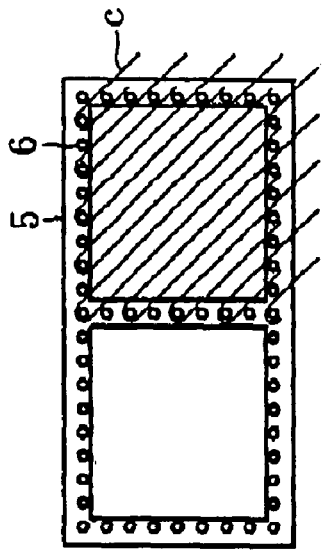
FIG. 10(D) illustrates a state in which a set of strands of fiber reinforcement are strung over half the area of a fiber reinforcement string jig in one direction.
Figure 10E:
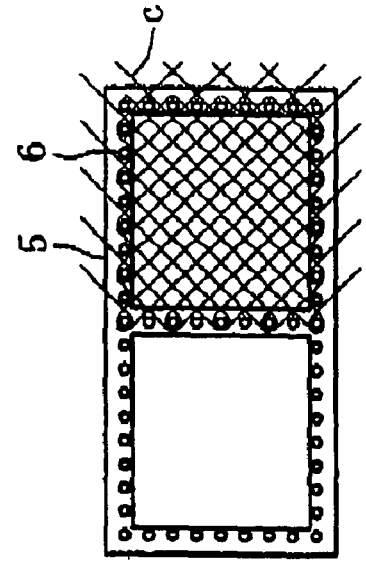
FIG. 10(E) illustrates a state in which another set of strands of fiber reinforcement are strung over half the area of the fiber reinforcement string jig in a direction different from that of the strands shown in FIG. 10(D)

To obtain the desired sloped profile, an additional set of strands of the fiber reinforcement c that has the same direction as the strands shown in FIG. 10(A) is overlaid on top of the pattern formed above in half of the area of the fiber reinforcement string jig 5, as shown in FIG. 10(D). Another set of strands of the fiber reinforcement c having a different direction from that of FIG. 10(D) is then overlaid in the same direction as the strands strung in FIG. 10(B), as shown in FIG. 10(E). This is followed by overlaying of an additional set of strands of the fiber reinforcement c in the same direction as the strands strung in FIG. 10(C), as shown in FIG. 10(F).

Figure 10F:
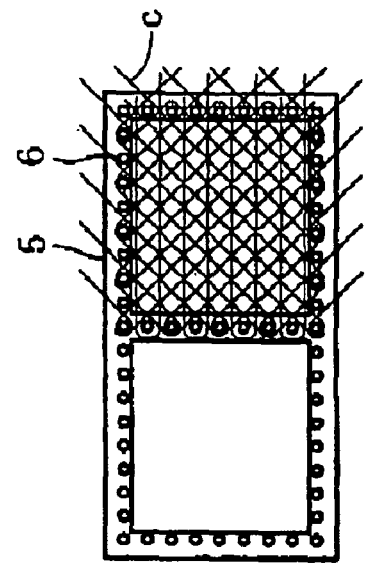
FIG. 10(F) illustrates a state in which still another set of strands of fiber reinforcement are strung over half the area of the fiber reinforcement string jig in a longitudinal direction.
Figure 11A:
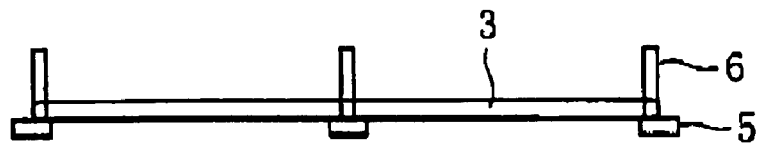
FIG. 11(A) is a side view of the reinforcing filament assembly in the state shown in FIG. 10(C).
Figure 11B:
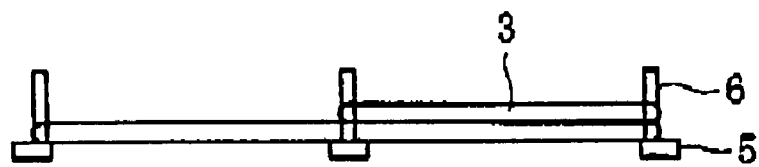
FIG. 11(B) is a side view of the reinforcing filament assembly in the state shown in FIG. 10(F).
Figure 11C:
FIG. 11(C) is a side view of the reinforcing filament assembly shown in FIG. 11(B) that has been removed from the fiber reinforcement string jig.
Figure 11D:
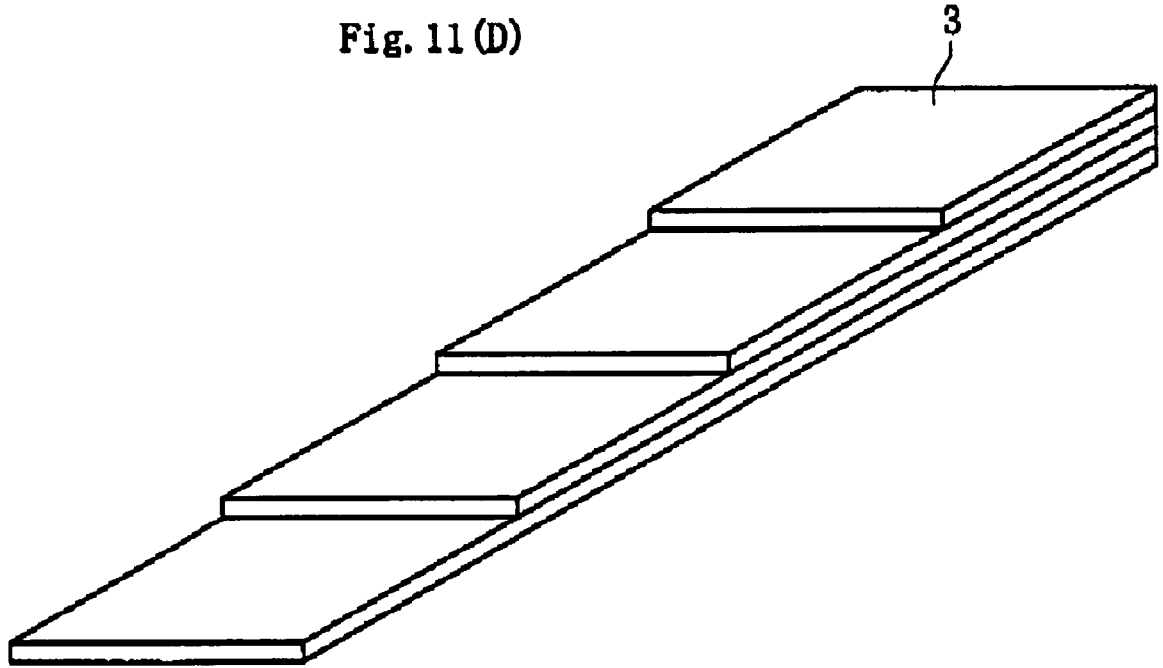
FIG. 11(D) is a schematic perspective view showing a dry preform for a composite material having a sloped profile in accordance with the present invention.

The reinforcing filament assembly 3 in the state shown in FIG. 10(C) is shown in cross-section in FIG. 11(A), whereas the reinforcing filament assembly 3 in the state shown in FIG. 10(F) is shown in cross-section in FIG. 11(B). A cross-section of the reinforcing filament assembly 3, which is obtained by the above-described process of stringing strands of the fiber reinforcement and has been removed from the fiber reinforcement string jig 5, is shown in FIG. 11(C). By forming multiple steps of the layers of fiber reinforcement in the similar manner as described above, the reinforcing filament assembly 3 with a sloped profile as shown in FIG. 11(D) can be obtained.

Figure 12B:
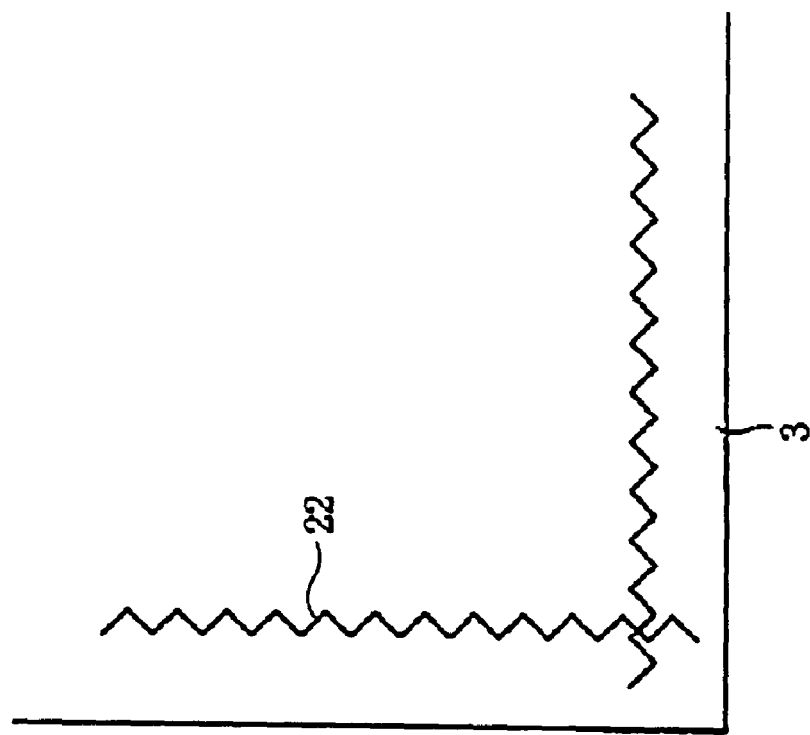
FIG. 12(B) is a schematic plan view showing one example of zigzag stitches provided in accordance with the present invention.
Figure 12A:
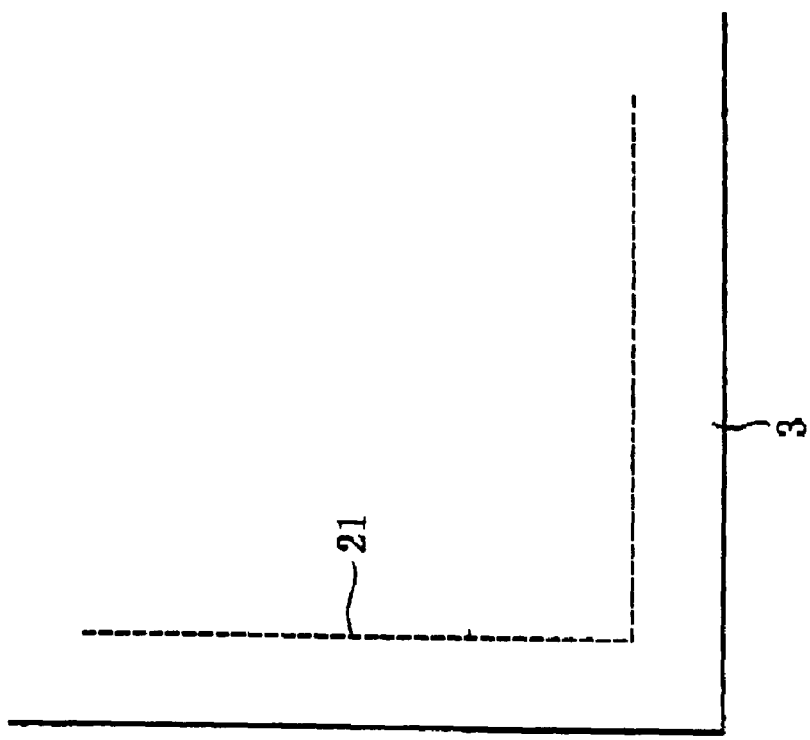
FIG. 12(A) is a schematic plan view showing one example of straight stitches provided in accordance with the present invention.

When it is desired to hold together, by stitching, more than one reinforcing filament assemblies of various configurations obtained in accordance with the present invention, different types of stitches may be employed as shown in FIG. 12. For example, a straight stitch 21 may be provided to hold the reinforcing fiber assemblies 3 together as shown in FIG. 12(A). When the reinforcing filament assemblies are deformed out of plane as in the cases of deformation from the state of FIG. 2(B) to the state of FIG. 2(C) or deformation from the state of FIG. 2(D) to the state of FIG. 2(E), a zigzag stitch 22 is preferably employed because of its flexibility. Such a stitch ensures smooth deformation of the reinforcing filament assemblies. Alternatively, a proper knitting or tufting technique may be employed to hold the reinforcing filament assemblies together. Examples of the fibers used for that purpose include, not to mention inorganic fibers such as carbon fibers and ceramic fibers, organic fibers such as aramid fibers and polyester fibers. When needle punch or thermoplastic resin is used as a means of holding the reinforcing filament assemblies together, the reinforcing filament assemblies are secured to one another over the entire area of the assemblies. This manner of holding reinforcing filament assemblies together is highly efficient and helps reduce the manufacturing cost of the dry preforms for composite materials significantly.

In essence, the present invention is a method for producing a dry preform for a composite material for use as a structural material. This method is characterized in that, before or after unifying a reinforcing filament assembly including a first fiber reinforcement layer and a second fiber reinforcement layer, the reinforcing filament assembly is deformed in and/or out of plane to form a dry preform with a complex cross-sectional shape. The first fiber reinforcement layer is formed by stringing a first set of parallel strands of fiber reinforcement over a part of a plane within any shape along a predetermined axis included within the plane. The second fiber reinforcement layer is formed by stringing a second set of parallel strands of fiber reinforcement over the plane of the shape at an angle with respect to the axis. In this manner, unlike conventional production processes of dry preforms, highly strong dry preforms for a composite material can be obtained at low cost and without complicated processes. The production method according to the present invention allows industrial scale mass-production of dry preforms for composite materials for use as structural materials with an L-, T-, H-, or H-shaped or other complex cross-sectional shape, the production of which has been deemed difficult until now.

In essence, the present invention is an apparatus for producing a dry preform for a composite material having a curved shape. This apparatus includes: a plurality of pin members, each including a predetermined number of pins for stringing strands of fiber reinforcement, the pin members being arranged opposite one another and spaced apart by a distance corresponding to a width of the dry preform; a space maintaining member for connecting the pin members to one another along a length of the dry preform in such a manner that the pin members can move toward or away from one another, and for keeping the distance between the opposed pin members; and an end pin member provided on at least one longitudinal end thereof and extending along the width of the apparatus, and including a predetermined number of pins, the end pin member being able to pivot about a center as viewed along the width thereof so that a tension that is caused when the reinforcing filament assembly is deformed remains even. The apparatus is capable of deforming to describe an arch about its longitudinal axis. In this manner, the present invention makes it possible to form at least one fiber reinforcement layer, at a significant efficiency, over a part of a plane within any desired shape in such a manner that strands of fiber reinforcement extend parallel to a predetermined axis included in the desired shape.

In essence, the present invention is an apparatus for producing a dry preform for a composite material for use as a structural material. This apparatus includes: a set of fiber reinforcement guide pipes for stringing a first fiber reinforcement layer and a second fiber reinforcement layer, the number of the guide pipes corresponding to the number of strands of fiber reinforcement or the number of rows of strands of fiber reinforcement that are strung at a time; a set of bars for securing the set of fiber reinforcement guide pipes and keeping the distance between the guide pipes; an actuator for driving the set of fiber reinforcement guide pipes and the set of bars to either move the guide pipes and the bars along a straight axis or move the bars at an angle with respect to the straight axis; and a creel unit for feeding the strands of fiber reinforcement to the set of fiber reinforcement guide pipes. In this manner, the present invention makes it possible to form, at a significant efficiency, the first fiber reinforcement layer and the second fiber reinforcement layer in such a manner that strands of fiber reinforcement in the first fiber reinforcement layer extend parallel to a predetermined axis contained within the desired shape and strands of fiber reinforcement in the second fiber reinforcement extend at an angle with respect to the predetermined axis.

What is claimed is:

1. A method for producing a dry preform for a composite material for use as a structural material, comprising the step of
    (a) providing a planar reinforcing filament assembly comprising a first fiber reinforcement layer and a second fiber reinforcement layer, the first fiber reinforcement layer including strands of fiber reinforcement extending straight along an axis, the second fiber reinforcement layer including strands of fiber reinforcement directed at an angle with respect to the axis, wherein the first fiber reinforcement layer covers half the area of the planar reinforcing filament assembly while the second reinforcement layer covers the entire area of the planar reinforcing filament assembly;
    (b) deforming the planar reinforcing filament assembly out of plane along with a curved axis to form a curved reinforcing filament assembly having the same curvature on the same plane;
    (c) deforming the curved reinforcing filament assembly where solely the second fiber reinforcement layer is formed out of the plane to form a first resultant reinforcing filament assembly having a flanged portion and an L-shaped cross-section;
    forming a second resultant reinforcing filament assembly having a flanged portion and a L-shaped cross-section through the steps (a)-(c); and
    holding together the first and second resultant reinforcing filament assemblies to form a dry preform having an L-shaped cross-section and a shape bent along the curved axis, in which the first fiber reinforcement layer including strands of fiber reinforcement directed along the curved axis and the second fiber reinforcement layer including strands of fiber reinforcement directed at an angle with respect to the curved axis extend throughout the dry perform.

2. A method for producing a dry preform for a composite material for use as a structural material according to claim 1, wherein
    the first fiber reinforcement layer is formed by stringing the first set of parallel strands of fiber reinforcement over a part or all of the plane with continuously varying thickness and/or width along the axis contained within the plane, and the second fiber reinforcement layer is formed by stringing the second set of parallel strands of fiber reinforcement over the plane of the shape at the angle with respect to the axis.

3. A method for producing a dry preform for a composite material for use as a structural material according to claim 1 wherein
    the first and second resultant reinforcing filament assemblies are held together by means selected from stitching, knitting, tufting, needle punch, and thermoplastic resin is used either independently or in combination.

4. A method for producing a dry preform for a composite material for use as a structural material according to claim 2 wherein
    the first and second resultant reinforcing filament assemblies are held together by means selected from stitching, knitting, tufting, needle punch, and thermoplastic resin is used either independently or in combination.

* * * * *